United States Patent [19]

Hubbard

[11] Patent Number: 4,487,544
[45] Date of Patent: Dec. 11, 1984

[54] TOWING VEHICLE

[76] Inventor: John S. Hubbard, R.R. 1, Box 36, Parker City, Ind. 47368

[21] Appl. No.: 417,185

[22] Filed: Sep. 13, 1982

[51] Int. Cl.³ .............................................. B60P 3/12
[52] U.S. Cl. .................................... 414/563; 280/402
[58] Field of Search ........................ 414/563, 629–631, 414/637; 280/402

[56] References Cited

U.S. PATENT DOCUMENTS

| | | | |
|---|---|---|---|
| 3,152,704 | 10/1964 | Russell | 414/563 |
| 3,225,949 | 12/1965 | Erickson et al. | 414/629 |
| 3,285,443 | 11/1966 | Gaumont | 414/563 |
| 3,322,396 | 5/1967 | Hubbard | 414/563 X |
| 3,897,879 | 8/1975 | Bubik | 414/563 |
| 4,236,862 | 12/1980 | McCormick | 414/631 X |
| 4,384,817 | 5/1983 | Peterson | 414/563 |

Primary Examiner—Joseph E. Valenza
Assistant Examiner—David A. Bucci
Attorney, Agent, or Firm—Woodard, Weikart, Emhardt & Naughton

[57] ABSTRACT

Disclosed is a towing vehicle or wrecker of the type in which a winch drawn cable is attached to the trailing portion of an auto or truck to be towed and a carrier member ascends an inclined track elevating the leading portion of the load as the cable is winched in. The apparatus is characterized by pivotal mounting of the inclined member with a hydraulic positioning cylinder for aiding in acquisition of a load, such as a disabled auto which is ditched or laterally displaced from the wrecker. The pivoted, inclined member also facilitates cornering of the wrecker and load when in motion.

5 Claims, 11 Drawing Figures

TOWING VEHICLE

BACKGROUND OF THE INVENTION

In my prior U.S. Pat. No. 3,322,396 there is disclosed and claimed a towing vehicle in which a pivoted saddle attached to a carrier member engages and supports the leading (in the towing direction) portion of the load. The carrier ascends a track provided by an inclined member rigidly secured to a stationary support carried by the towing vehicle bed or base. This lifting of the leading portion of the load occurs because of the winching in of a cable attached to the trailing portion, such as the rear axle, of a vehicle to be towed. While the pivotally mounted saddle, to a restricted degree, permitted acquisition of loads laterally misaligned with the towing vehicle, substantial maneuvering and positioning of the towing vehicle was required to rather closely align it with the load. Further, once the load had been acquired and the towing operation had begun, since the load accommodating structure was rigid and immobile, the towing cable tended to wear excessively when cornering with the load because of its angular relation to the accommodating sheaves.

The structure of the present invention remedies these difficulties by providing a pivotal mounting for the inclined member with its track on which the carrier and its saddle ascends when the load is acquired. The inclined member with its carrier and cable sheaves is pivoted about an axis parallel to the carrier member's longitudinal axis by a power element. This enables the apparatus to swing sideward to acquire more laterally displaced loads without excessive preliminary maneuvering of the towing vehicle. As the load is towed, the pivotal connection is permitted to float so that the inclined member can move pivotally as required while the vehicle and load are cornered, thus permitting the sheaves, carried by the inclined member, to align themselves with the cable and excessive wear or fracturing of the cable is avoided.

SUMMARY OF THE INVENTION

One embodiment of the present is a vehicle for acquiring and towing a load comprising a base and a support means extending upwardly from the base, an elongated vertically inclined member mounted on the support means and carrying idler sheaves adjacent its upper and lower ends, a carrier member supported by and movable along the length of the inclined member, the mounting of the inclined member providing for pivotal movement thereof about an axis parallel to the inclined member's longitudinal axis, the carrier member being adapted to engage and support the leading portion of the load, a winch having a cable passing through the idler sheaves, the cable being adapted for attachment to the trailing portion of the load so that reeling in the cable by the winch elevates the carrier member on the inclined member and raises the leading portion of the load, and power means carried by the support means and acting on the inclined member to pivot it about the axis parallel to its longitudinal axis to facilitate the acquisition of loads laterally displaced from the towing vehicle.

It is an object of the present invention to provide a towing vehicle having means for connecting to a disabled vehicle laterally offset therefrom.

A further object of the present invention is to provide a new and improved vehicle for towing a second vehicle along a path including corners minimizing interconnecting cable wear due to the lateral non-alignment of the two vehicles.

Related objects and advantages of the present invention will be apparent from the following description.

DESCRIPTION OF THE PREFERRED EMBODIMENTS

Figure 1:
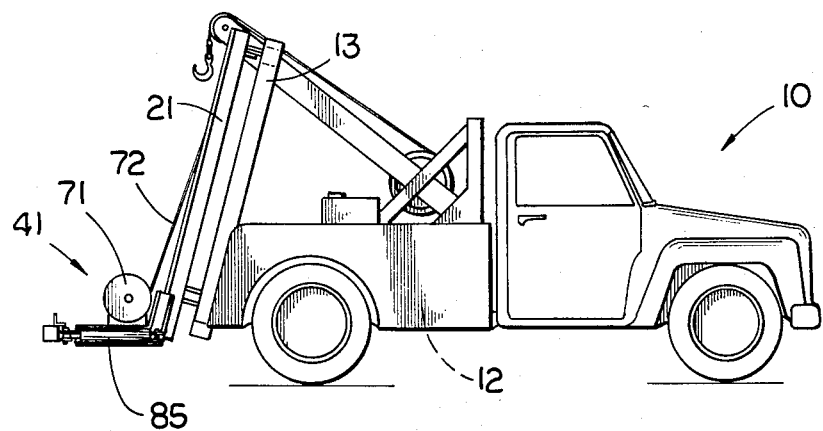
FIG. 1 is a side view of a towing vehicle embodying the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Initially referring to FIG. 1, there is shown a towing vehicle or truck 10 which includes a base or bed 12 with a stationary, rigid support frame 13 rigidly secured to the rear portion of the base and extending upwardly therefrom. The support frame may be provided with extensible legs spanned by a transverse beam. The beam may be lowered to contact the ground to prevent the towing vehicle from rolling or tipping when a load, such as a disabled vehicle, is being pulled from an adjacent ditch. Hydraulic means, not shown, may be utilized to retract the legs, thus raising the transverse beam, while the load is being towed.

Figure 7:
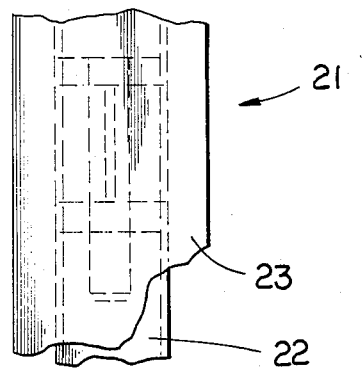
FIG. 7 is a fragmentary top plan view of a further portion of the structure shown in FIG. 2.

Adjacent frame 13 and pivotally secured thereto is an elongated, vertically inclined member 21 which is composed of a tubular beam 22, box shape in cross-section and topped by a guide plate 23 (see FIGS. 2, 5 and 7) which is wider than beam 22 and extends outwardly on each side of the beam beyond the beam side margins.

Plates 24 and 26 (FIG. 5) extend rearwardly from the support frame 13 and bed 12 toward inclined member 21 and are apertured to receive pivot pins 27 and 28, respectively. The pin 27 extends through a reinforcing bracket 29 and an underlying arm 31 both rigidly secured together and to the inclined member 21 adjacent it upper end. The pin 28 extends through two spaced lugs 32, separated by a gusset plate 33 and into the plate 26 extending rearwardly from and rigidly attached to the bed 12, the pin 28 being welded to the edge of gusset 33. It will be evident that the pivotal attachment described permits the member 21 to move pivotally about the longitudinal axis of pivot pins 27 and 28, that is, about an axis parallel to the longitudinal axis of the inclined member 21.

Figure 4:
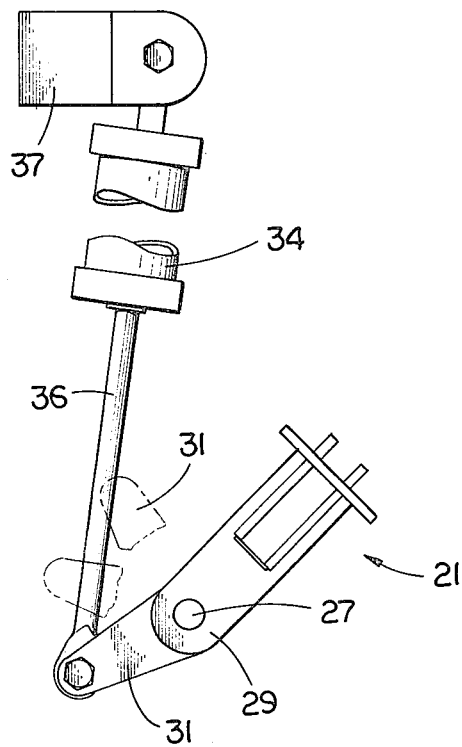
FIG. 4 is a top plan view of the upper, free end of the structure shown in FIG. 1.

The power means for controlling this pivotal motion includes a double acting hydraulic cylinder 34 (FIG. 4) having its piton rod 36 pivotally connected to the free end of arm 31 and the cylinder body being pivotally supported on the adjacent upright portion 37 of support frame 13. As may best be seen in FIG. 4, extension and contraction of the cylinder between extreme extended position, through the mid position, to the extreme retracted position, angularly pivots the inclined member 21 for a total of approximately 90°, that is, 45° on each side of the pivotal axis. The point of application of the pivotal force exerted by extension of the power means is spaced from the pivotal axis extending through pins 27 and 28 so that a levered force is obtained. The manner of control of the hydraulic cylinder 34 will subsequently be described with reference to FIG. 8.

Figure 2:
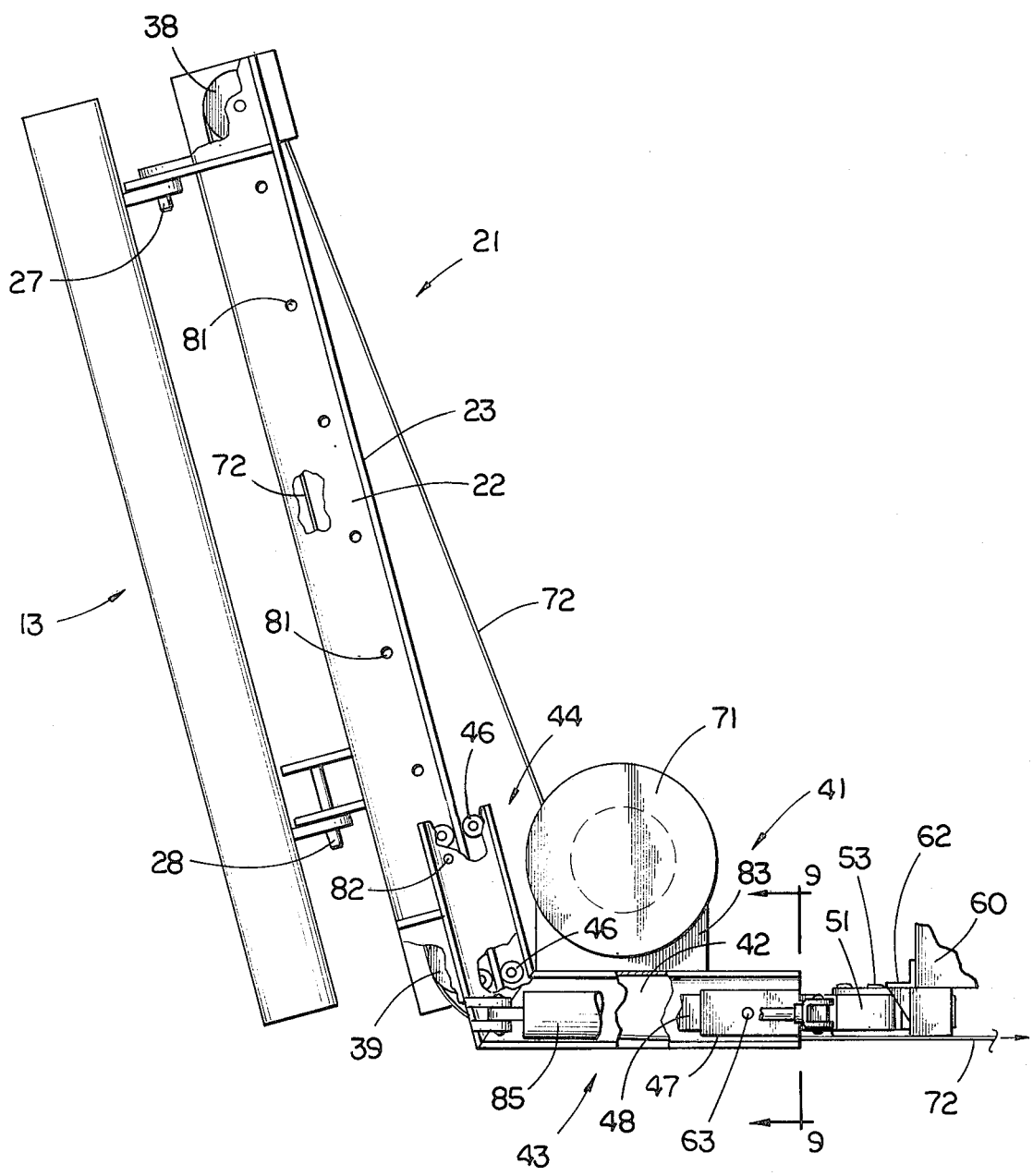
FIG. 2 is a side view, with portions broken away, of the load-acquiring component of the structure of FIG. 1.

At its upper end the inclined member 21 carries an idler cable sheave or pulley 38 and adjacent its lower end an idler sheave 39, both freely rotatable. The member 21 further supports a movable, generally L-shaped carrier member indicated generally at 41 and shown in detail in FIG. 2. As may be seen in FIGS. 2 and 9, carrier member 41 is formed by rigidly joining spaced, back-to-back channels 42 to provide a horizontal leg 43 and an inclined leg 44 (FIG. 2). The carrier member is provided with eight rollers 46 (only 4 of which are visible in FIG. 2) which engage and roll along the overhanging opposite side marginal portion of the top plate 23 which form spaced, parallel, coextensive tracks for the carrier rollers and permits the carrier 41, which spans the spaced tracks, to ascend and descend the inclined member 21.

Figure 3:
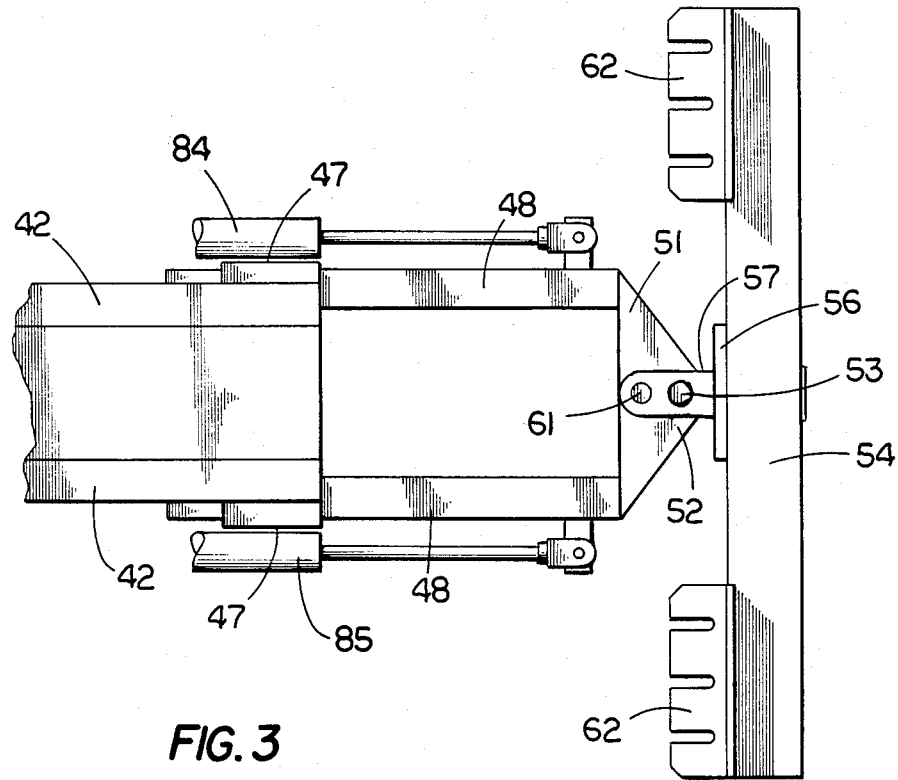
FIG. 3 is a fragmentary, top plan view of a portion of the structure shown in FIG. 1.
Figure 9:
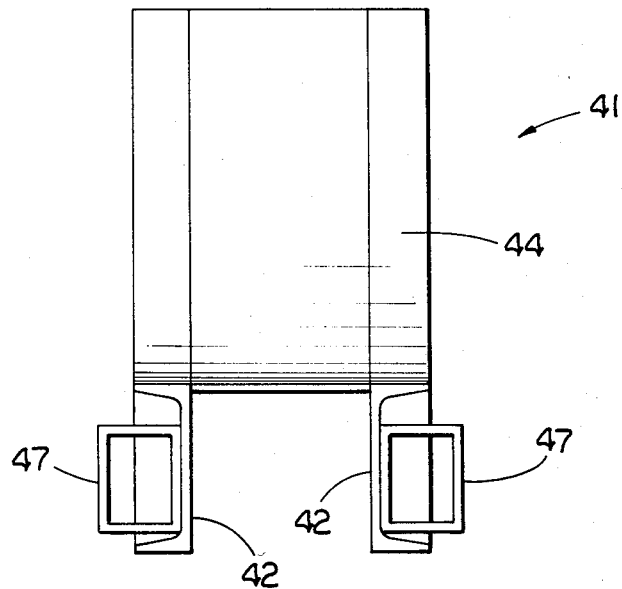
FIG. 9 is an end view of the carrier component shown in FIG. 2 taken generally along the line 9—9 of FIG. 2.

The horizontal leg 43 of the carrier has two box-like tubes 47 rigidly secured within the spaced channels 42 (FIG. 9). These slidably receive rectangular, tubular beams 48 forming the extensible portion of the carrier member. As may best be seen in FIG. 3, the members 48 are joined at their free ends by transverse member 51 having an apertured portion 52 which receives the pivot pin 53.

A spreader bar or saddle 54 is fixedly secured by an attachment 56 to a C-shaped bracket 57 (FIG. 3) which is pivotally mounted by pivot pin 53 to portion 52. Bracket 57 and portion 52 are also apertured at 61 to receive a locking pin to fix the bar 54 with respect to the carrier member after the bar has been attached to the load. The bar 54 can pivot approximately 45° in the horizontal plane about the axis of pin 53. This ability to angularly move the saddle 54 aids in acquisition of sidewardly displaced loads. This pivotally mounted saddle is disclosed in my aforementioned U.S. Pat. No. 3,322,396. The end portions of the bar or saddle 54 are provided with angle brackets 62 which are slotted on their horizontally extending portions to receive fastening safety chains. The bar 54 accommodates the frontal portion, indicated fragmentarily at 60 in FIG. 2, of a load such as the front portion of the frame of a disabled vehicle. The bar 54 is moved to an extended position (FIG. 3) by means of extensible members 48 slidably moved by a pair of cylinder motors 84 and 85 mounted between and to members 48 and leg 44. Members 48 are moved to their retracted position of FIG. 2 and a locking pin is inserted through aperture 63 (FIG. 2) to lock the bar 54 with respect to carrier member 41 before towing begins. The carrier member is thus adapted to engage and support the leading or frontal portion of the load. The distal end of each piston rod of motors 84 and 85 are connected to members 48 whereas the housings of cylinder motors 84 and 85 are mounted to inclined leg 44.

As may best be seen in FIG. 2, the bed of the towing vehicle carries a powered winch 71 which controls extension and retraction of a towing cable 72. Power winch 71 is mounted on bracket 83 fixedly secured to horizontal leg 43 of carrier 41. Winch 71 includes a conventional brake and hydraulic motor to control rotation of the winch. The cable passes over the upper sheave 38 and through aperture 55 (FIG. 5) on the inclined member 21 and under the lower sheave 39. It extends generally horizontally rearwardly and is attached to the rear axle of a disable vehicle, that is, to the trailing or rear portion of the load in the load acquisition process.

Figure 8:
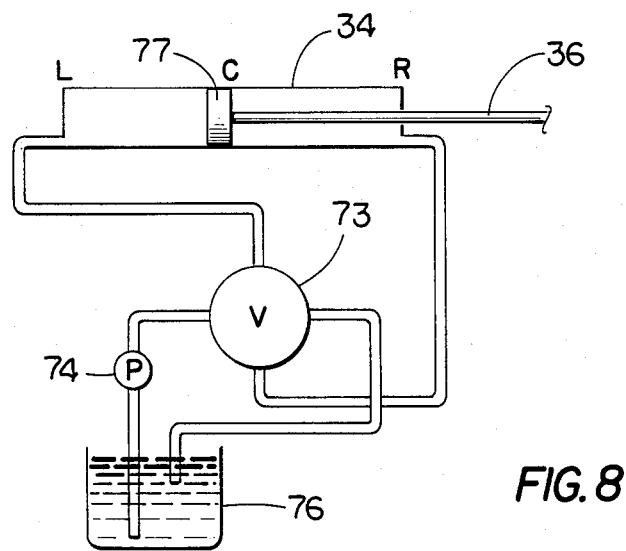
FIG. 8 is a schematic showing of the hydraulic circuit which may be used to control the pivotal position of the inclined member.

FIG. 8 illustrates schematically a hydraulic means for controlling the actuation of hydraulic cylinder 34. A conventional four-way, four-position valve 73 is utilized. A hydraulic pump 74 and a reservoir of hydraulic fluid 76 are schematically illustrated. The piston of cylinder 34 is indicated at 77 and the piston rod 36 extends for pivotal attachment to arm 31 (FIG. 4) previously described. The hydraulic lines connecting these components are such that the four positions of valve 73, manually acquired, function to: (1) place the fluid chambers on both sides of the piston in communication with each other providing a "floating" position for the piston (with its movement damped by frictional resistance to the flow of fluid in the lines from one chamber to the other); (2) right hand chamber pressurized, left chamber connected to the reservoir return; (3) left chamber pressurized, right chamber connected to reservoir return; and (4) both chambers pressurized providing a center-lock condition. A float, right, left and center-lock position for cylinder 34 and, consequently, for determining the corresponding angular position of inclined member 21 with respect to the axis of pivot pins 27 and 28 (FIG. 5) is thereby attained.

In operation, assuming a laterally displaced load such as disabled vehicle off the road in a ditch, the towing vehicle of the present invention is backed to a point adjacent the leading or front end of the disabled vehicle. The bar 54 is extended by cylinder motors 84 and 85 and pivoted about pin 53 and, additionally, cylinder 34 is actuated to the appropriate one of its off-center positions. This pivoting of inclined member 21 with attached carrier 41 plus the pivotal movement of bar 54 provides substantial, improved lateral freedom to acquire sidewardly displaced loads.

When bar 54 has been inserted under and attached to the front portion of the frame (60 in FIG. 2), the members 48 may be retracted and a locking pin inserted in aperture 61 (FIG. 3) to lock the position of the bar. The cable 72 is then extending from the winch 71 and attached to the trailing portion, that is, the rear axle of the disabled vehicle. Operation of the winch to draw in the cable then draws the carrier member 41 and the leading portion of the vehicle up the tracks provided by inclined member 21 to the desired height.

Figure 5:
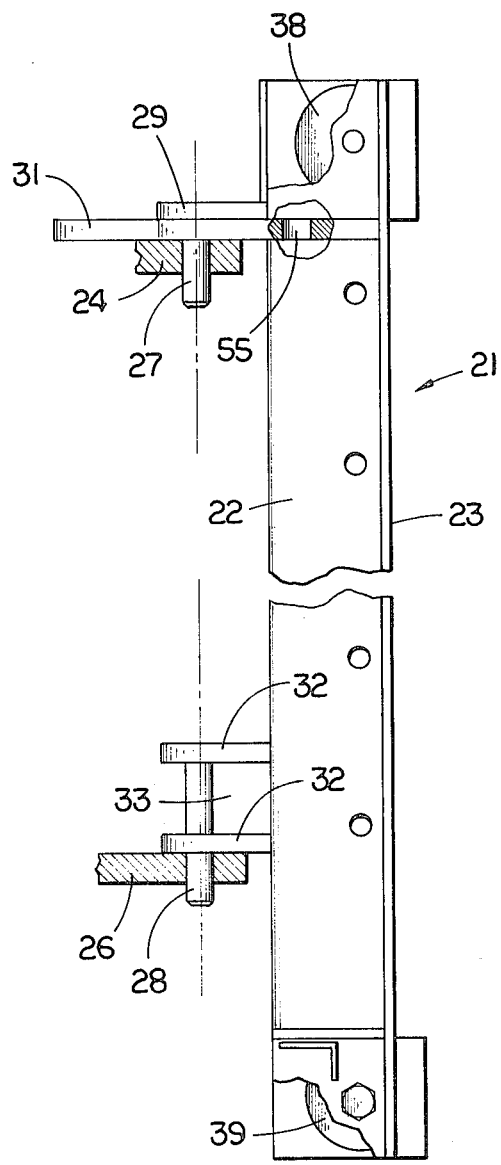
FIG. 5 is a fragmentary side view of the structure shown in FIG. 1 illustrating the details of the pivotal mounting of the inclined member shown in FIG. 1.
Figure 6:
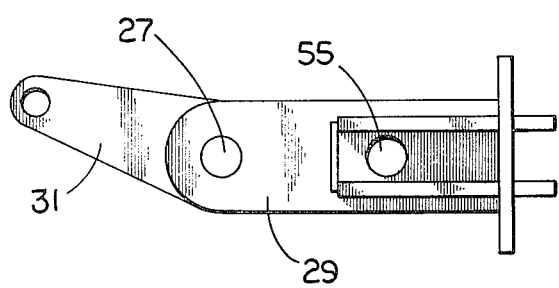
FIG. 6 is a top plan view of a portion of the structure shown in FIG. 5.

During towing of the vehicle the valve 73 is placed in "float" position so that, in turns, the inclined member 21 and pulleys 38 and 39 carried thereby may swivel or pivot about the axis of pins 27 and 28 (FIG. 5). The pulleys are thus able to align themselves with the cable during turns preventing excessive wear on the cable. The providing of an inclined member, with its elevated carrier, which can pivot, in controlled fashion, about the axis of pins 27 and 28 thus, primarily, has two beneficial results. It permits acquisition of lateral loads without as much maneuvering of the towing vehicle as would be necessary if only bar 54 were capable of pivotal movement. Further, the ability of the inclined member and the cable pulleys carried thereby to pivot during the towing operation eliminates wear on the cable caused by its scraping of the pulley walls during turns.

The lifting of the front end of the load by means of a cable attached to the trailing end of the load and towing of the load in this attitude results in greatly improved distribution of the weight of the load between the front and rear axles of the towing vehicle. During towing of the vehicle, carrier member 41 along with winch 71 is allowed to float up and down the inclined member 21. In actual practice, it has been found that the carrier moves approximately one foot in vertical distance as the towing vehicle pulls the disabled vehicle across hills and valleys in the road thereby allowing the distance between the two vehicles to increase and decrease ensuring a proper amount of load to be exerted on the towing vehicle by the disabled vehicle through the carrier winch combination. The carrier and front portion of the towing vehicle acts as a counterweight balancing the load of the front portion of the disabled vehicle carried off of the ground. Cable 72 is attached to the rear axle of the disabled vehicle and extends around lower sheave 39 and upper sheave 38 to winch 71. Winch 71 is hydraulically locked in its rotational position preventing cable 72 from being further extended or retracted from the winch as the carrier and winch move up and down the inclined member 21. A series of openings 81 are provided on inclined member 21 to receive a lock pin provided in registering aperture 82 in carrier 41 when the towing vehicle is not towing another vehicle.

Figure 11:
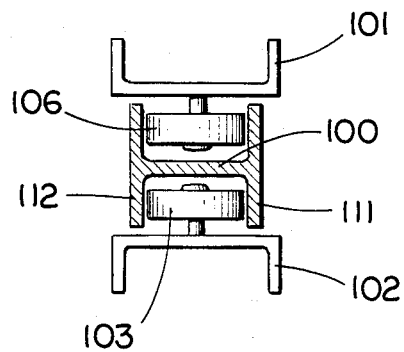
FIG. 11 is a cross-sectional view taken along the line 11—11 of FIG. 10 and viewed in the direction of the arrows.
Figure 10:
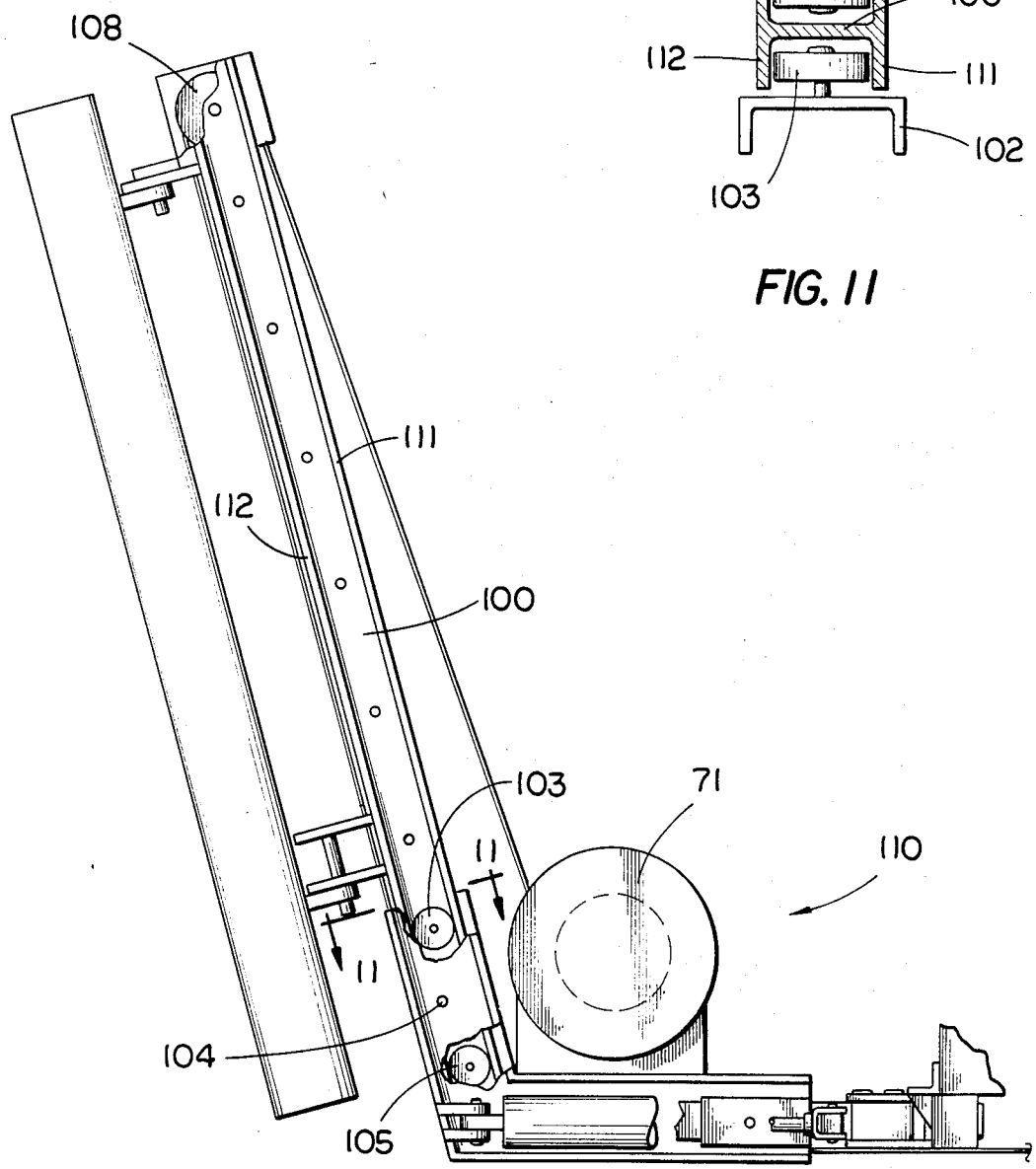
FIG. 10 is the same view as FIG. 2 only showing an alternate embodiment of the vertically inclined member and associated carrier.

An alternate embodiment of the inclined member with carrier is shown in FIG. 10. Inclined member 100 is mounted identically to inclined member 21 previously described with the only difference therebetween being that member 100 has a cross-section configured as an H to allow for a different mounting arrangement to the carrier relative to the inclined member. Carrier 110 likewise is identical with respect to carrier 41 and has a winch 71 identical to that provided on carrier 41. The cable on winch 71 extends over a top sheave 108 and a bottom sheave rotatably mounted to member 100. In lieu of a total of six rollers 46 provided on carrier 41 on each side of inclined member 21, carrier 110 has only three rollers 103, 104 and 105 mounted to channel 102 and positioned on one side of the H shaped inclined member 100 and a second set of three rollers mounted on channel 101 and positioned on the opposite side of the inclined member. One such roller on the opposite side is shown in FIG. 11 as roller 106. Each roller 103 through 106 along with the two rollers located beneath roller 106 are positioned between the rearward wall 111 and forward wall 112 of inclined member 100. As such, carrier 110 may be lowered closer to the ground as compared to carrier 41 as long as at least the top two rollers on each side of the carrier engage inclined member 100. That is, roller 105 and the correspondingly roller on the opposite side of the carrier may disengage inclined member 100 while the carrier is moved to its lowest position. A pair of hydralic cylinder motors are used to extend and retract the towing bar. Likewise, inclined member 100 is pivotally mounted to the main frame of the towing vehicle and is pivotable about a vertically inclined axis by a cylinder motor previously described for the other embodiment and shown in FIG. 4.

While the invention has been illustrated and described in detail in the drawings and foregoing description, the same is to be considered as illustrative and not restrictive in character, it being understood that the preferred embodiments have been shown and described and that all changes and modifications that come within the spirit of the invention are desired to be protected.

What is claimed is:

1. A vehicle for acquiring and towing a load comprising a base and a suppport means extending upwardly from the base, an elongated vertically inclined member pivotally mounted on said support means and carrying idler sheaves thereon adjacent its upper and lower ends, carrier means supported by and movable along the length of said inclined member, the mounting of said inclined member providing for pivotal movement thereof about an axis parallel to the inclined member's longitudinal axis, said carrier means including a saddle being adapted to engage and support the leading portion of said load, a winch mounted on said carrier means and having a cable passing through said idler sheaves, said cable having one end being adapted for attachment to the trailing portion of the load so that reeling in said cable by the winch elevates said carrier means on said inclined member and raises the leading portion of the load, and power means carried by said support means and acting on said inclined member to pivot it about said axis parallel to its longitudinal axis to facilitate the acquisition of loads laterally displaced from the towing vehicle, said cable and winch being located on said inclined member to pivot with said idler sheaves as a unit whenever said power means pivots said inclined member.

2. A towing vehicle as claimed in claim 1 in which said inclined member is provided with spaced parallel, coextensive tracks and said carrier means includes a carrier member which spans the space between said tracks and carrier rollers accommodated by the tracks, said saddle is pivotally mounted to said carrier member and is pivotable when said inclined member is pivoted to increase lateral freedom to position said saddle adjacent said load located laterally relative to said vehicle.

3. A towing vehicle as claimed in claim 1 having means for locking the position of said carrier means with relation to said inclined member while allowing free pivotal motion of said carrier means relative to said support means.

4. A towing vehicle as claimed in claim 1 in which said power means may be functionally disconnected from said inclined member during towing to permit floating of the pivotal connection of the inclined member to the support means and thereby facilitate cornering of the towing vehicle and its load and said carrier means may be allowed to move freely on said inclined member as said load applies force to the connected cable.

5. A towing vehicle comprising:
a base;
a vertically inclined member pivotally mounted on said base;
carrier means slidably mounted to said inclined member and movable vertically therealong, said carrier means being pivotable with said inclined member about a first axis parallel to said inclined member, said carrier means having a towed vehicle engaging portion pivotable about a second vertical axis;
winch means mounted on said carrier means and having a cable extending therefrom upwardly along said member and then downwardly therebeneath being attachable to the rear portion of a towed vehicle having a front portion supported by said engaging portion of said carrier means, said winch means operable to hold said cable while said carrier means moves along said member transferring load from said front portion to said towing vehicle, said winch means and said cable pivotable about said first axis as a unit with said carrier means and said inclined member.

* * * * *

UNITED STATES PATENT AND TRADEMARK OFFICE
CERTIFICATE OF CORRECTION

PATENT NO. : 4,487,544

DATED : December 11, 1984

INVENTOR(S) : John S. Hubbard

It is certified that error appears in the above-identified patent and that said Letters Patent is hereby corrected as shown below:

In column 6, line 56, "carrier" should read "carries".

Signed and Sealed this

Seventh Day of May 1985

[SEAL]

Attest:

DONALD J. QUIGG

Attesting Officer    Acting Commissioner of Patents and Trademarks